Figure 1:
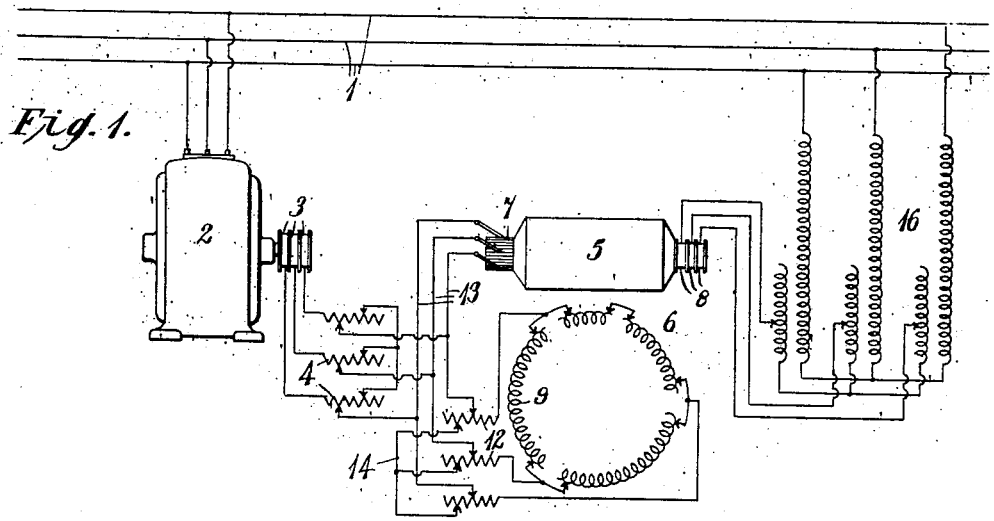

F. W. MEYER.
SYSTEM OF DISTRIBUTION.
APPLICATION FILED JAN. 11, 1913.

1,235,585.

Patented Aug. 7, 1917.

WITNESSES:
Fred H. Miller
Otto S. Schairer

INVENTOR
Friedrich W. Meyer
BY
Wesley G. Carr
ATTORNEY

UNITED STATES PATENT OFFICE.

FRIEDRICH W. MEYER, OF WILKINSBURG, PENNSYLVANIA, ASSIGNOR TO WESTINGHOUSE ELECTRIC AND MANUFACTURING COMPANY, A CORPORATION OF PENNSYLVANIA.

SYSTEM OF DISTRIBUTION.

1,235,585.

Specification of Letters Patent.

Patented Aug. 7, 1917.

Application filed January 11, 1913. Serial No. 741,462.

*To all whom it may concern:*

Be it known that I, FRIEDRICH W. MEYER, a subject of the Emperor of Germany, and a resident of Wilkinsburg, in the county of Allegheny and State of Pennsylvania, have invented a new and useful Improvement in Systems of Distribution, of which the following is a specification.

My invention relates to systems of electrical distribution and particularly to those in which auxiliary machines are employed in connection with induction motors for the purpose of regulating and assisting the induction motors in their operation, and for compensating the power factors of the systems.

The object of my invention is to provide a system of the character indicated that is particularly adapted for use when the voltage of the supply circuit is high and in which the speed of the induction motor and the power factor of the system, as well as the proportion of the load upon the auxiliary machine when operating to assist the induction motor, may be readily and conveniently regulated.

In another application, Serial No. 741,457 filed of even date herewith, I have disclosed and covered a system of distribution, similar to that herein set forth, in which an induction motor is electrically connected to an auxiliary regulating machine, the stator winding of which is adapted to serve both as means for transforming the voltage of the secondary circuit of the induction motor, and as means for adjusting the power factor of the system, the power factor adjustment being effected by changing the positions of the several phase divisions of the stator winding relatively to the stator itself and the commutator brushes, and the transformation ratio being changed by adjustment of the numbers of convolutions between certain points of connection to the stator winding.

In still another application, Serial No. 741,459, also filed of even date herewith, I have disclosed and covered another system in which the auxiliary machine is mechanically coupled to the induction motor in addition to being electrically connected thereto, the auxiliary machine being similar in construction to that employed in the system of application, Serial No. 741,457.

In certain cases, and particularly where the voltage of the supply circuit is high, it is not desirable to employ the stator winding as means for transforming the voltage, and the present system differs from those above-mentioned in that a voltage regulating transformer is interposed in the connections between the auxiliary machine and the supply circuit, and the stator winding of the auxiliary machine is adapted to serve only as means for regulating the power factor of the system and the proportion of the load upon the auxiliary machine.

Figure 2:
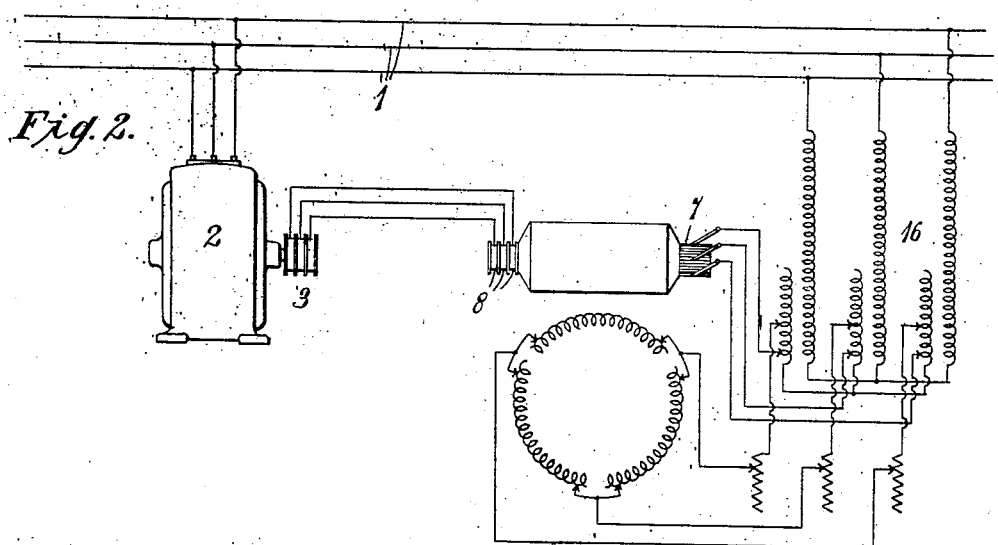
Figure 3:
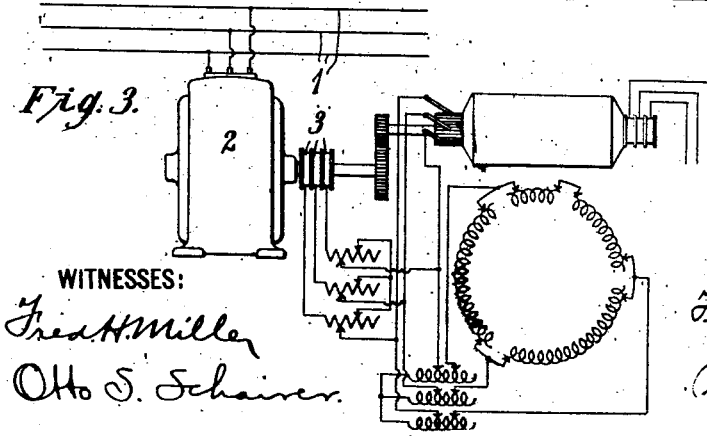

My invention is illustrated in the accompanying drawing, Figure 1 of which is a diagrammatic view of a system of distribution embodying the same, and Figs. 2 and 3 are similar views of modifications of the system of Fig. 1.

The present system comprises a suitable polyphase supply circuit 1 which supplies current to the primary winding of induction motor 2 that is adapted to drive any suitable load, such as a compressor, hoist or rolling mill (not shown). The secondary winding of the induction motor is connected through its slip rings 3 and suitable adjustable resistances 4, that are provided with an adjustable and removable connector 4ª, to the armature 5 of an auxiliary machine 6, the said connections being made either to the commutator cylinder 7 of the armature, as shown in Fig. 1, or to the slip rings 8 thereof, as shown in Fig. 2. The auxiliary machine 6 is provided with a distributed stator winding 9 having a plurality of separate phase divisions, and in the system of Fig. 1, this winding is connected to the commutator brushes through adjustable resistances 12 and conductors 13 that are adjustably connected to the said resistances, but which may also be entirely disconnected therefrom. The resistances are also provided with adjustable and removable connections 14 whereby they may be connected in a closed circuit with the stator winding when the conductors 13 are disconnected therefrom, this system of connections being used for operation below synchronism substantially as set forth in application, Serial No. 741,458. The purpose of the connections between the stator winding and the armature is to provide for impressing voltages upon the stator winding to supplement and influence the voltages inductively produced therein. The values of these impressed voltages are determined by adjustment of the resistances 12. If desired, a transformer may be substituted for the resistances 12, as shown in Fig. 3, and, since current may then either be delivered from the secondary circuit of the induction motor to the stator winding of the auxiliary machine, or vice versa, operation, both above and below synchronism with the transformer in circuit, is permissible, though, on account of the small amount of current delivered to the stator winding, resistances are preferably employed. The points of connection to the stator winding of the auxiliary machine are adjustable for the purpose of permitting of adjustment of the numbers of active convolutions in the several phase divisions of the said winding, and the positions thereof relatively to the stator. Both of these adjustments affect the power factor of the system, but the former adjustment will have this effect only in case it is such that it tends to change the speed of the auxiliary machine, which it is prevented from doing, because it is connected with the induction motor and is operating in synchronism with relation thereto.

The stator winding of the auxiliary machine may be connected and arranged to obtain any suitable and desirable characteristics, for instance, in the manner set forth in my application, serial No. 653,380, filed October 7, 1911, or the stator may be provided with a winding of the lap and wave form like that set forth in application, Serial No. 741,460, filed of even date herewith. The latter winding, however, will usually be found useful only where a large range of regulation is desired.

The adjustment of the speed of the induction motor is effected by means of a voltage-regulating transformer 16 that is interposed in the connections between the armature of the auxiliary machine and the supply circuit.

In the operation of the system, the induction motor is started by suitable regulation of the resistances 4, and the auxiliary machine is started by the application of the proper potential thereto from the transformer 16 and by regulating its speed by means of the resistances 12. If the positions of the phase divisions of the stator winding of the auxiliary machine or frequency changer are then properly adjusted, the auxiliary machine may be caused to run at the desired speed either above or below synchronism, and will carry the induction motor along with it without the necessity of a special synchronizing operation. The resistances 4 may then be disconnected, and the resistances 12 employed for regulating the power factor of the system. The resistances 12 are usually preferably adjusted so that the transformer 16 will cause a little more than the necessary magnetizing current to flow in the system through the auxiliary machine in order to thereby effect the desired phase compensation.

For operation below synchronism, the stator winding may be entirely disconnected from the armature of the auxiliary machine, in which case the currents in the stator winding will be only such as are induced therein, and these may be regulated in value by adjustment of the resistances 12, substantially as in application, Serial No. 741,458. However, for synchronous and hypersynchronous operation, the stator winding will be preferably connected to the armature. It may also be advisable, under certain conditions, when operating below synchronism, to leave a certain amount of the resistances 4 in the circuit between the secondary member of the induction motor and the armature of the auxiliary machine, since the auxiliary machine requires a certain minimum voltage for producing the proper torque. However, the amount of this resistance is generally not very large.

As above set forth, the system of Fig. 2 differs from that of Fig. 1 in that the slip rings of the induction motor are connected to the slip rings of the auxiliary machine, rather than to the commutator thereof. This system will sometimes be found advantageous when the output of the induction motor is small and its speed is high. In this arrangement, current must always be supplied to the stator winding of the auxiliary machine, the value of the said currents being readily adjustable by making the connections directly to the transformer 16.

When the induction motor is started and stopped frequently, and it is desired that it be started promptly, it may be advisable to mechanically couple the auxiliary machine to the induction motor in any suitable manner, such as that shown in Fig. 3. In this system, the auxiliary machine may be caused to operate as a motor for assisting the induction motor in carrying the load, in which case the operation of the system will be highly efficient, since the auxiliary machine utilizes the energy of the secondary member of the induction motor and converts it into mechanical energy for driving the load. The auxiliary machine may also operate as a generator and supply current to the secondary member of the induction motor, but if the induction motor is to operate above synchronism and produce a high torque, it is preferable to operate it as a frequency changer for currents received from the supply circuit and applied to the secondary member of the induction motor, or as both a frequency changer and supplemental motor.

When the auxiliary machine is mechanically coupled to the induction motor, as shown in Fig. 3, adjustment of the power factor of the system can be effected only by rotative adjustment of the positions of the several phase divisions of the stator winding of the auxiliary machine. Adjustment of the numbers of active convolutions in the said stator winding of this system does not materially affect the power factor, as it does in systems where the machines are only electrically connected, but it varies the proportion of the mechanical load carried by the auxiliary machine operating as a motor to assist the main motor. This is an important advantage of the system.

I claim as my invention:

1. A system of distribution comprising a supply circuit, an induction motor supplied therefrom, an auxiliary machine having an armature connected both to the secondary member of the induction motor and to the supply circuit, and a stator winding the positions and active convolutions of the several phase divisions of which are adjustable, means whereby variable amounts of current are supplied to the said stator winding, and a variable ratio transformer interposed in the connections between the armature of the auxiliary machine and the supply circuit.

2. A system of distribution comprising a supply circuit, an induction motor supplied therefrom, an auxiliary machine having an armature connected both to the secondary member of the induction motor and to the supply circuit, and a stator winding, a plurality of adjustable resistors, means whereby said stator winding may be supplied with varying amounts of energy directly from said secondary member, and means whereby said stator winding may be short-circuited through said resistors and hence supplied with varying amounts of energy derived from the armature of said auxiliary machine solely by induction.

3. A system of distribution comprising a supply circuit, an induction motor supplied therefrom, an auxiliary machine having an armature connected both to the secondary member of the induction motor and to the supply circuit, and a phase-wound stator winding, the positions and active convolutions of the several phase divisions of which are adjustable, means whereby said stator winding may be supplied with varying amounts of energy directly from said secondary member or whereby said stator winding may be supplied with varying amounts of energy derived from the armature of said auxiliary machine solely by induction.

4. The combination with two electrical circuits and an interposed machine having a stator winding, and an armature provided with a collector and a commutator respectively connected to the said circuits, of means for varying the current inductively produced in the stator winding, and for independently supplying thereto, a variable amount of current received from the circuit that is connected to the said commutator.

5. The combination with two electrical circuits and an interposed machine having a stator winding, the positions and active convolutions of the several phase divisions of which are adjustable, and an armature provided with a collector and a commutator respectively connected to the said circuits, of means whereby variable amounts of current are supplied to the said stator winding and whereby the said stator winding may be short-circuited.

In testimony whereof, I have hereunto subscribed my name this 31st day of December, 1912.

FRIEDRICH W. MEYER.

Witnesses:
OTTO S. SCHAIRER,
B. B. HINES.